(12) United States Patent
Ishii

(10) Patent No.: US 9,017,875 B2
(45) Date of Patent: Apr. 28, 2015

(54) CATHODE ACTIVE MATERIAL, CATHODE, AND NONAQUEOUS ELECTROLYTE SECONDARY BATTERY

(75) Inventor: Takehiko Ishii, Fukushima (JP)

(73) Assignee: Sony Corporation, Tokyo (JP)

( * ) Notice: Subject to any disclaimer, the term of this patent is extended or adjusted under 35 U.S.C. 154(b) by 998 days.

(21) Appl. No.: 12/325,636

(22) Filed: Dec. 1, 2008

(65) Prior Publication Data
US 2009/0142668 A1 Jun. 4, 2009

(30) Foreign Application Priority Data
Nov. 30, 2007 (JP) ................................ 2007-311700

(51) Int. Cl.
| | | |
|---|---|---|
| H01M 10/36 | (2010.01) | |
| H01M 4/58 | (2010.01) | |
| H01M 4/02 | (2006.01) | |
| H01M 4/62 | (2006.01) | |
| C01B 25/26 | (2006.01) | |
| G11B 5/596 | (2006.01) | |
| H01M 4/136 | (2010.01) | |
| H01M 4/36 | (2006.01) | |
| H01M 10/052 | (2010.01) | |

(52) U.S. Cl.
CPC ............... *G11B 5/596* (2013.01); *H01M 4/136* (2013.01); *H01M 4/364* (2013.01); *H01M 4/366* (2013.01); *H01M 4/5825* (2013.01); *H01M 10/052* (2013.01); *H01M 2004/021* (2013.01); *H01M 2004/028* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | |
|---|---|---|
| 6,165,642 A | 12/2000 | Kawakami et al. |
| 6,632,566 B1 | 10/2003 | Yamada et al. |
| 6,638,322 B1 | 10/2003 | Kawakami et al. |
| 7,025,907 B2 * | 4/2006 | Kohzaki et al. ............ 252/518.1 |
| 7,217,474 B2 | 5/2007 | Yamada et al. |
| 2002/0102459 A1 | 8/2002 | Hosoya et al. |
| 2005/0221188 A1 | 10/2005 | Takami et al. |

(Continued)

FOREIGN PATENT DOCUMENTS

| | | |
|---|---|---|
| EP | 1 921 698 | 5/2008 |
| EP | 2 061 115 | 5/2009 |

(Continued)

OTHER PUBLICATIONS

Shin et al., "Electrochemical properties of the carbon-coated LiFePO4 as a cathode material for lithium-ion secondary batteries" Journal of Power Sources, 159, Feb. 20, 2006, pp. 1383-1388.*

(Continued)

*Primary Examiner* — Ula C. Ruddock
*Assistant Examiner* — Osei Amponsah
(74) *Attorney, Agent, or Firm* — K&L Gates LLP

(57) ABSTRACT

The present application provides a nonaqueous electrolyte secondary battery which includes a cathode having a cathode active material layer, an anode, and a nonaqueous electrolyte, wherein the cathode active material layer includes secondary particles of a lithium phosphate compound having olivine structure, an average particle diameter A of primary particles constituting the secondary particles is 50 nm or more and 500 nm or less, and a ratio B/A of a pore diameter B of the secondary particles to the average particle diameter A of the primary particles is 0.10 or more and 0.90 or less.

15 Claims, 8 Drawing Sheets

(56) References Cited

U.S. PATENT DOCUMENTS

| | | | |
|---|---|---|---|
| 2007/0059598 A1* | 3/2007 | Yang | 429/209 |
| 2007/0207385 A1* | 9/2007 | Liu et al. | 429/231.9 |

FOREIGN PATENT DOCUMENTS

| | | | |
|---|---|---|---|
| JP | 09-082312 | | 3/1997 |
| JP | 11-329504 | | 11/1999 |
| JP | 2001-110414 | | 4/2001 |
| JP | 2001-328813 | | 11/2001 |
| JP | 2002-110162 | | 4/2002 |
| JP | 2002-117845 | | 4/2002 |
| JP | 2003-036889 | | 2/2003 |
| JP | 2003-292309 | | 10/2003 |
| JP | 2005-158401 | * | 6/2005 |
| JP | 2005-251554 | | 9/2005 |
| JP | 2005-310421 | | 11/2005 |
| JP | 2007-035358 | | 2/2007 |
| JP | 2007-059142 | | 3/2007 |
| JP | 2007-103298 | | 4/2007 |
| JP | 2007-250417 | | 9/2007 |
| JP | 2009-152188 | | 7/2009 |
| WO | 00/60680 | | 10/2000 |
| WO | 2007/116971 | | 10/2007 |
| WO | 2008-067677 | | 6/2008 |
| WO | 2008/081944 | | 7/2008 |
| WO | 2009/119262 | | 10/2009 |

OTHER PUBLICATIONS

Office Action dated Sep. 30, 2011 for corresponding European Appl. No. 09 014 646.5-2119.

Japanese Patent Office, Notice of reasons for refusal issued in connection with Japanese Patent Application No. 2009-165162, dated Jul. 3, 2012. (4 pages).

European Patent Office, Extended European Search Report issued in connection with European Patent Application No. 12002042.5, dated Jun. 5, 2012. (6 pages).

Japanese Office Action issued Jul. 2, 2013 for corresponding Japanese Appln. No. 2009-165162.

Korean Intellectual Patent Office, Notification of Reason for Refusal issued in connection with Korean Patent Application No. 10-2008-0119407, dated Jan. 21, 2015. (7 pages).

* cited by examiner

CATHODE ACTIVE MATERIAL, CATHODE, AND NONAQUEOUS ELECTROLYTE SECONDARY BATTERY

CROSS REFERENCES TO RELATED APPLICATIONS

The present application claims priority to Japanese Patent Application JP 2007-311700 filed in the Japanese Patent Office on Nov. 30, 2007, the entire contents of which is being incorporated herein by reference.

BACKGROUND

The present application relates to a cathode active material and a nonaqueous electrolyte secondary battery, particularly to a cathode active material, a cathode, and a nonaqueous electrolyte secondary battery, which are excellent in high capacity and high-power characteristics.

Recently, a lot of portable electronic devices such as camera-integrated videotape recorders (VTRs), cellular phones, or laptop computers has appeared and it is contemplated to reduce the size and weight thereof. Research and development of batteries, particularly secondary batteries to be used as portable power supplies of such electronic devices have been actively proceeding in order to improve their energy density.

Among batteries using a nonaqueous electrolyte, a lithium-ion secondary battery has been highly expected and the market for the battery has been growing since a greater energy density is obtained as compared to that of a lead battery which is an aqueous system electrolytic solution secondary battery in the past and a nickel-cadmium battery.

Since characteristics of the lithium-ion secondary battery such as lightweight and high energy density are suitable for application to electrical vehicles and hybrid electrical vehicles, examinations aimed at increasing the size of the battery and achieving a high power discharging capacity of the battery have been increased, particularly, in recent years.

With reference to a nonaqueous system secondary battery typified by the lithium-ion secondary battery, oxide cathodes such as $LiCoO_2$, $LiNiO_2$, and $LiMn_2O_4$ are generally used as the cathode active material. This is because a high capacity as well as a high voltage can be given and the oxide cathodes are excellent in high filling properties, which is advantageous for reduction in the size and weight of portable devices.

However, when these cathodes are heated in the charged state, they begin to release oxygen at 200 to 300° C. When the oxygen release starts, the battery can exhibit thermal runaway because a combustible organic electrolytic solution is used as an electrolytic solution. Therefore, when the oxide cathode is used, it is not easy to ensure the safety particularly in large-sized batteries.

On the other hand, as for a cathode material having olivine structure, oxygen release does not occur even when it exceeds 350° C. and the material is excellent in safety, which is described in A. K. Padhi, et al, J. Electrochem. Soc., Vol. 144, and p. 1188. As an example of the cathode material, lithium iron phosphate which is made mostly from iron ($LiFe_{1-x}M_xPO_4$, wherein M is at least one of metallic materials selected from the group including manganese (Mn), nickel (Ni), and cobalt (Co)) is listed.

With reference to the cathode material having olivine structure, electric potential flatness is very high since charging and discharging are proceeded in a state where layers of $LiFePO_4$ and $FePO_4$ coexist. Therefore, when constant-current/constant-voltage charging (i.e., an ordinary charge mode for lithium ion battery) is performed, the charging is carried out in the constant-current charging state. Therefore, when the battery using the cathode material having olivine structure is charged at the same charging rate, the charging time can be reduced as compared to cathode materials in the past such as $LiCoO_2$, $LiNiO_2$, and $LiMn_2O_4$.

On the other hand, as for the cathode material having olivine structure, insertion and desorption of lithium during charging and discharging of the battery is slow and the electrical resistance is large as compared to lithium cobaltate ($LiCoO_2$) used in the past. Overvoltage is increased during large current charging and discharging, which causes difficulty in obtaining sufficient charge-discharge capacities.

Efforts on the problems have been made. For example, a technique that conductive fine particles are supported on the particle surface of lithium iron phosphate and an active material is improved to improve charge-discharge capacities during large current charging and discharging is disclosed in Japanese Patent Application Laid-Open (JP-A) No. 2001-110414 and JP-A No. 2003-36889.

Generally, in order to reduce the electrical resistance of the cathode, the cathode material having olivine structure is generally mixed with powder carbon such as carbon black, flake carbon such as graphite, and fibrous carbon.

Further, the method that a cathode active material having a sufficiently large specific surface area obtained by setting the particle diameter of primary particles of lithium iron phosphate to 3.1 µm or less is used to improve the electron conductivity in the cathode has been disclosed in JP-A No. 2002-110162.

Furthermore, a technique that binding of the cathode active material to the conductive agent, binding of the cathode active material to the cathode current collector, and binding of the cathode current collector to the conductive agent are improved by using a binder having a high binding capacity and load characteristics are improved during large current charging and discharging is disclosed in JP-A No. 2005-251554.

In fact, the electrical resistance of the cathode is reduced by the above-described techniques. However, considering application of the techniques to electrical vehicles and hybrid vehicles, the power characteristics are still insufficient as compared to lithium cobaltate having a layer structure or lithium manganate having a spinel structure, which remains as a big problem.

In order to obtain high-power characteristics using a composite metal material having olivine structure which is highly safe characteristics, for example, a method that the specific surface area is increased to make the reaction area larger by decreasing the particle diameter of an olivine-type cathode active material and secondary particles in which such primary particles are aggregated are formed, which are used as the cathode material has been proposed.

In this regard, the formation of secondary particles is performed to reduce the amount of the binder to be used. When the primary particles whose particle diameter is smaller are used as the cathode material, for example, power characteristics are improved by adding carbon black with a large specific surface area. The necessary amount of the binder is increased to stabilize a cathode mixture slurry to be produced when a cathode active material layer is formed or obtain adhesive strength of the electrode and a current collector foil. This causes problems of inhibition of the electrical conductivity of the electrode, reduction of high-power characteristics, and reduction of the productivity in a coating step because of an increase in the amount of solvent in the cathode mixture. Further, the amount of the cathode active materials is decreased, which leads the reduction of the battery capacity.

In order to solve these problems, it is necessary to reduce the amount of the binder in the cathode mixture.

A cathode active material having a large particle diameter while maintaining the specific surface area can be produced by using secondary particles prepared from primary particles of the composite metal material having olivine structure whose particle diameter is small, which results in reduction of the amount of the binder.

SUMMARY

However, in such a secondary particulate cathode active material, there is a void (hereinafter conveniently referred to as a pore) between aggregated primary particles. When the binder enters into the pore, the primary particles can be covered with the binder. When the binder enters into the void, the resistance between the primary particles which constitute the secondary particles is increased and the electrical conductivity is lowered, and thus load characteristics of the battery are reduced. Further, the amount of the binder presented at the interface between the cathode active material layer and the cathode current collector is decreased, which results in separating the cathode active material layer from the cathode current collector. Further, the binder enters into pores of the secondary particles, and thus the permeability of the electrolytic solution is also reduced and the reactivity of the cathode active material is decreased.

Therefore, it is desirable to provide a cathode active material, a cathode, and a nonaqueous electrolyte secondary battery which can satisfy both high battery capacity and high load characteristics in order to solve the problems.

According to an embodiment, there is provided a nonaqueous electrolyte secondary battery including a cathode in which a cathode active material layer that includes a cathode active material containing a lithium phosphate compound having olivine structure is formed, an anode, and a nonaqueous electrolyte, wherein the cathode active material includes secondary particles composed of aggregates of primary particles of the lithium phosphate compound having an average particle diameter of 50 nm or more and 500 nm or less and a ratio B/A of a pore diameter B of the secondary particles to an average particle diameter A of the primary particles is 0.10 or more and 0.90 or less, more preferably 0.10 or more and 0.75 or less.

As for such a nonaqueous electrolyte secondary battery, it is preferable that primary particles are carbon material-coated.

In such a nonaqueous electrolyte secondary battery, it is preferable to use fibrous carbon as the conductive agent from the viewpoint of improving the electrical conductivity of the cathode active material layer.

According to another embodiment, there is provided a cathode active material including secondary particles of a lithium phosphate compound having olivine structure where an average particle diameter A of primary particles constituting the secondary particles is 50 nm or more and 500 nm or less and a ratio B/A of a pore diameter B of the secondary particles to the average particle diameter A of the primary particles is 0.10 or more and 0.90 or less, more preferably 0.10 or more and 0.75 or less.

According to another embodiment, there is provided a cathode including secondary particles of a lithium phosphate compound having olivine structure where an average particle diameter A of primary particles constituting the secondary particles is 50 nm or more and 500 nm or less and a ratio B/A of a pore diameter B of the secondary particles to the average particle diameter A of the primary particles is 0.10 or more and 0.90 or less, more preferably 0.10 or more and 0.75 or less.

The use of such cathode active materials allows for preventing the binder from entering into pores of the secondary particles constituting the cathode active material. This also prevents the amount of the binder at the interface between the cathode active material layers or the interface between the cathode active material layer and the cathode current collector from being decreased. Further, this prevents insufficient penetration of the electrolytic solution into the cathode active materials.

The present application in an embodiment provides the cathode active material, the cathode, and the nonaqueous electrolyte secondary battery which can satisfy the electrical conductivity of the primary particles in the secondary particles, binding of the secondary particles or binding of the cathode active material layer to the cathode current collector and are excellent in high capacity and high-power characteristics.

Additional features and advantages are described herein, and will be apparent from the following Detailed Description and the figures.

DETAILED DESCRIPTION

An embodiment of the present application will be described below with reference to the accompanying drawings.

[Structure of Nonaqueous Electrolyte Secondary Battery]

Figure 1:
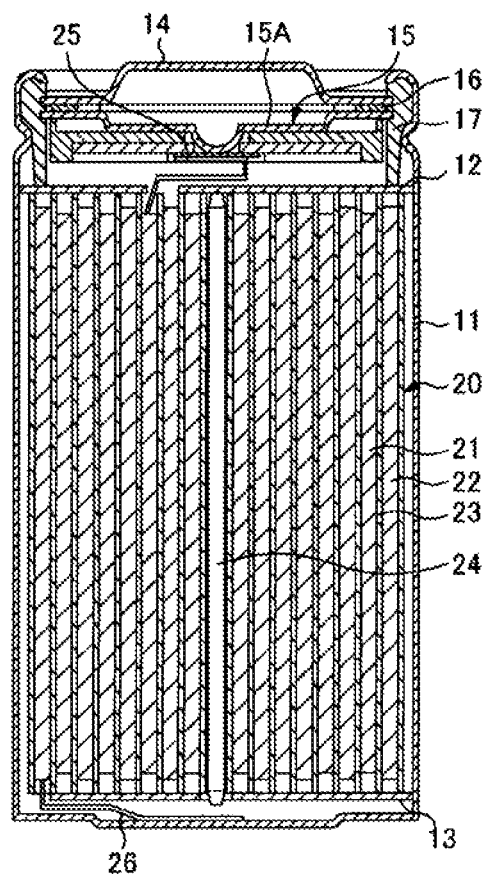
FIG. 1 is a cross-sectional view showing a structure of a nonaqueous electrolytic solution battery according to an embodiment.

FIG. 1 shows a cross-sectional structure of the nonaqueous electrolyte battery (hereinafter conveniently referred to as the secondary battery) according to the first embodiment. This battery is, for example, a lithium-ion secondary battery.

As shown in FIG. 1, this secondary battery is a so-called cylindrical shape and includes a spiral electrode body 20 in which a band-like cathode 21 and a band-like anode 22 are stacked and wound via a separator 23 in a substantially hollow cylinder-like battery can 11. The battery can 11 is made of, for example, iron (Fe) plated with nickel (Ni) and one end thereof is closed, and the other end is opened. Further, a pair of insulating plates 12 and 13 are arranged to sandwich the spiral electrode body 20 perpendicularly to a periphery surface thereof in the battery can 11.

A battery lid 14, as well as a safety valve mechanism 15 and a positive temperature coefficient (PTC) element 16 which are positioned inside the battery lid 14 are mounted in the open end of the battery can 11 by caulking via a gasket 17 to seal the inside of the battery can 11. The battery lid 14 is made of the same material as that of the battery can 11.

The safety valve mechanism 15 is electrically connected to the battery lid 14 through the PTC element 16. When an internal pressure of the battery becomes more than a certain value due to the internal short circuit or heating from outside, a disk plate 15A is inverted to cut the electric connection between the battery lid 14 and the spiral electrode body 20. The PTC element 16 restricts electric currents, when its resistance increases with an increase in temperature, to prevent unusual heat generation due to high electric currents. The gasket 17 is made of, for example, an insulating material and asphalt is applied to the surface thereof.

The spiral electrode body 20 is wound around, for example, a center pin 24. A cathode lead 25 containing aluminum (Al) or the like is connected to the cathode 21 of the spiral electrode body 20, and an anode lead 26 containing nickel (Ni) or the like is connected to the anode 22. The cathode lead 25 is welded to the safety valve mechanism 15 to be electrically connected with the battery lid 14. The anode lead 26 is welded to the battery can 11 to be electrically connected.

Figure 2:
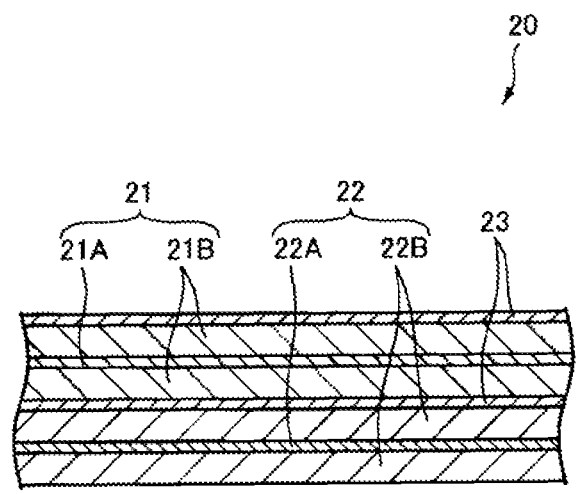
FIG. 2 is a partly enlarged cross-sectional view showing a spiral electrode body shown in FIG. 1.

FIG. 2 is a partially enlarged view of the spiral electrode body 20 shown in FIG. 1.

[Cathode]

The cathode 21 has, for example, a cathode current collector 21A and a cathode active material layer 21B formed on both sides of the cathode current collector 21A. In addition, the cathode active material layer 21B may be located only on one side of the cathode current collector 21A. The cathode current collector 21A is made of, for example, metal foil such as aluminum (Al) foil.

The cathode active material layer 21B contains, for example, a cathode active material, conductive agents such as fibrous carbon and carbon black, and a binder such as polyvinylidene fluoride (PVdF). As the cathode active material, for example, secondary particles composed of aggregates of primary particles of the lithium phosphate compound having olivine structure are used. As the primary particles, a material having a relatively small particle diameter (the average particle diameter is 50 nm or more and 500 nm or less) is used. This allows the reaction area of the active material to be increased. The secondary particles is produced by granulating the primary particles so that the ratio B/A of a diameter of a pore (hereinafter appropriately referred to as the pore diameter) B to the average particle diameter A of the primary particles constituting the secondary particles that is a void present between the primary particles is 0.10 or more and 0.90 or less, more preferably 0.10 or more and 0.75 or less.

When the ratio B/A is less than 0.10, the pore diameter of the secondary particles is far smaller than the average particle diameter of the primary particles. For this reason, although the binder does not easily enter into pores of the secondary particles, the permeability of the electrolytic solution is also reduced and the battery reaction of the cathode is decreased.

When the ratio B/A exceeds 0.90, the pore diameter of the secondary particles is larger than the average particle diameter of the primary particles. For this reason, the binder enters into pores of the secondary particles easily, resistance among the primary particles constituting the secondary particles is increased and thus the electrical conductivity is decreased. The binder entered into pores of the secondary particles and thus the amount of the binder used for binding of the secondary particles, binding of secondary particles to the conductive agent, and binding of the cathode active material including the secondary particles and the conductive agent to the cathode current collector was decreased. As a result, the cathode active material layer may be separated from the cathode current collector and it is difficult to form the cathode active material layer in itself.

For example, based on images of the primary particles that were observed with the Scanning Electron Microscope (SEM), major axes of the primary particles were measured. Then, an average particle diameter of the primary particles was calculated from an average value of the major axes. For example, a pore diameter of the secondary particles is measured by mercury porosimetry.

Examples of the lithium phosphate compound having the olivine structure include compounds represented by Chemical Formula I.

$$LiM_xPO_4 \quad \text{(Chemical Formula I)}$$

(wherein, M is at least one selected from the group including cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). x is $0 \leq x \leq 1$.)

The compounds expressed by Chemical Formula I can include $LiFePO_4$, $LiFe_{1-y}Me_yPO_4$, $LiFe_{1-y-z}Me1_yMe2_zPO_4$, $LiCoPO_4$, $LiCo_{1-y}Me_yPO_4$, $LiMn_{1-y}Me_yPO_4$, (wherein Me, Me1 or Me2 is one kind selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), $0<y<1$, and $0<z<1$).

In this regard, the surface of lithium phosphate compound may be supported by carbon materials or the like in order to improve the electrical conductivity.

The secondary particles can be granulated by a generally used method (e.g. spray-drying method). In the spray-drying method, the primary particles are dispersed in a solvent together with, for example, a carbon source material, which is sprayed under a high temperature atmosphere to evaporate the solvent quickly and then secondary particles in which primary particles coated with the carbon material are aggregated can be formed. The pore diameter of the secondary particles can be changed by adjusting the concentration of solvents for dispersing the primary particles and other granulation conditions.

As the conductive agent to be contained in the cathode active material layer, fibrous carbon is particularly preferable. The major axis of fibrous carbon is longer than those of carbon materials having a nearly spherical shape. Therefore, when fibrous carbon is used as the conductive agent, a contact area between the conductive agents can be decreased as compared to the case where the carbon materials having a nearly spherical shape are used. Since the conductive agents are connected by the binder, the amount of the binder on the conductive path is reduced by decreasing the number of the contact area and an increase of the resistance can be suppressed. Therefore, the use of fibrous carbon allows for improving the electrical conductivity in the thickness direction of the cathode active material layer.

As the fibrous carbon, for example, a so-called vapor grown carbon fiber formed by a gas phase method can be used. The vapor grown carbon fiber can be produced by, for example, blowing a vaporized organic compound together with iron to be used as a catalyst under a high temperature atmosphere. Any of the vapor grown carbon fiber remained in a produced state, the vapor grown carbon fiber heat-treated at about 800 to 1500° C., and the vapor grown carbon fiber graphitization-treated at about 2000 to 3000° C. can be used. Particularly, the vapor grown carbon fiber that is heat-treated and further graphitization-treated is preferable because the crystallinity of the carbon is enhanced and it has high electrical conductivity and high pressure resistance characteristics.

An average fiber diameter of the fibrous carbon is preferably 1 nm or more and 200 nm or less, more preferably 10 nm or more and 200 nm or less. An aspect ratio calculated using an average fiber diameter and an average fiber length and an equation (average fiber length/average fiber diameter) is preferably 20 or more and 20000 or less on an average, more preferably 20 or more and 4000 or less on an average, further preferably 20 or more and 2000 or less.

For example, when the cathode active material layer is thickened in order to improve volumetric efficiency of the battery, it is preferable to use secondary particulate carbon black as the conductive agent to be contained in the cathode active material layer. Since the major axis of secondary particulate carbon material as the conductive agent is longer than that of fibrous carbon and the contact area of the conductive agents is decreased, the electrical conductivity can be prevented from being decreased by the binder.

[Anode]

The anode 22 has an anode current collector 22A and an anode active material layer 22B formed on both sides of the anode current collector 22A. In addition, the anode active material layer 22B may be located only on one side of the anode current collector 22A. The anode current collector 22A is made of metal foil such as copper (Cu) foil.

The anode active material layer 22B contains, for example, an anode active material and further may contain other materials which do not contribute to charging, such as conductive agents, binders, or viscosity controlling agents, if necessary. Examples of the conductive agent include graphite fibers, metal fibers, or metal powders. Examples of the binder include fluorinated polymeric compound such as polyvinylidene fluoride (PVdF) or synthetic rubbers such as styrene butadiene rubber (SBR) or ethylene propylene diene rubber (EPDR).

The anode active material include any one, or two or more of the anode material which can electrochemically occlude and release lithium (Li) at an electric potential of 2.0 V or less versus lithium metal.

Examples of the anode material capable of occluding and releasing lithium (Li) include, for example, carbon materials, metallic compounds, oxides, sulfides, lithium nitrides such as $LiN_3$, lithium metals, metals capable of forming lithium and alloy or polymeric materials.

Examples of the carbon material include non-graphitizable carbon, graphitizable carbon, graphite, pyrolytic carbons, cokes, glassy carbons, organic polymer compound firing products, carbon fiber or activated carbon. Examples of such a coke include pitch coke, needle coke, or petroleum coke. Organic polymer compound firing products are obtained by firing and carbonizing polymeric materials such as a phenol resin and a furan resin at suitable temperatures. Some of them are categorized as non-graphitizable carbon or graphitizable carbon. Examples of the polymeric material include polyacetylene or polypyrrole.

Among the anode materials capable of occluding and releasing lithium (Li), the materials having a charge-discharge potential relatively close to that of lithium metal are preferable. This is because a high energy density of the battery is easily realized as the anode 22 has a low charge-discharge potential. Among them, these carbon materials are preferable because there is very little change of the crystal structure thereof produced in charge and discharge and high charge-discharge capacities and excellent cycle characteristics can be obtained. Particularly, graphite is preferable since it has a large electrochemical equivalent and a high energy density can be obtained. Further, non-graphitizable carbon is preferable since excellent cycle characteristics can be obtained.

Examples of the anode material capable of occluding and releasing lithium (Li) include a simple substance of lithium metal, a metal element capable of forming an alloy with lithium (Li), or a simple substance, an alloy or a compound of a metalloid element. These materials are preferable because a high energy density can be given. When they are used in combination with, particularly, carbon materials, the high energy density and excellent cycle characteristics can be obtained, which is more preferable. In the present specification, an alloy including one or more metallic elements and one or more metalloid elements is included in addition to an alloy including two or more metallic elements. Examples of the structures of the materials include a solid solution, an eutectic (eutectic mixture), an intermetallic compound and a concomitant state of two or more of the structures.

Examples of the metal element or metalloid element include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germamum (Ge), arsenic (As), silver (Ag), zirconium (Zr), yttrium (Y), or hafnium (Hf). As an alloy or a compound of such a metal element or metalloid element, for example, an alloy or a compound represented by a chemical formula of $Ma_fMb_gLi_h$ or a chemical formula of $Ma_sMc_tMd_u$ is included. In these chemical formulas, Ma represents at least one of a metal element and metalloid element capable of forming an alloy with lithium; Mb represents at least one of a metal element and a metalloid element other than lithium and Ma; Mc represents at least one of a nonmetallic element; Md represents at least one of a metal element and metalloid element other than Ma. Values of f, g, h, s, t, and u are $f>0$, $g \geq 0$, $h \geq 0$, $s>0$, $t>0$, and $u \geq 0$, respectively.

Among these elements, metal elements or metalloid elements, or an alloy or a compound thereof of Group 4B of the short period periodic table are preferable. Particularly, silicon (Si) or tin (Sn), or an alloy or a compound thereof are preferable. These elements may be a crystalline substance or amorphous.

Examples of the anode material capable of occluding and releasing lithium further include oxides, sulfides, and other metallic compounds such as lithium nitride ($LiN_3$). Examples of the oxide include $MnO_2$, $V_2O_5$, $V_6O_{13}$, NiS, and MoS. Further, examples of an oxide capable of occluding and releasing lithium at a relatively low electric potential include iron oxide, ruthenium oxide, molybdenum oxide, tungstic oxide, titanium oxide, and tin oxide. Examples of the sulfide include NiS and MoS.

[Separator]

As the separator 23, for example, a polyethylene porous film, a polypropylene porous film, a nonwoven fabrics made of a synthetic resin may be used. A nonaqueous electrolytic solution which is a liquid electrolyte is impregnated in the separator 23.

[Nonaqueous Electrolytic Solution]

The nonaqueous electrolytic solution contains a liquid solvent, a nonaqueous solvent such as an organic solvent, and an electrolyte salt dissolved in the nonaqueous solvent.

It is preferable that the nonaqueous solvent contains, for example, at least one of cyclic ester carbonates such as ethylene carbonate (EC) and propylene carbonate (PC). This is because the cycle characteristics can be improved. Particularly, when ethylene carbonate (EC) and propylene carbonate (PC) are mixed and contained, the cycle characteristics can be further improved, which is preferable.

It is preferable that the nonaqueous solvent contains at least one of chain carbonate esters such as diethyl carbonate (DEC), dimethyl carbonate (DMC), ethyl methyl carbonate (EMC), or methyl propyl carbonate (MPC). This is because the cycle characteristics can be further improved.

It is preferable that the nonaqueous solvent further contains at least either 2,4-difluoroanisole or vinylene carbonate (VC). This is because 2,4-difluoroanisole can improve the electric discharge capacity and vinylene carbonate (VC) can further improve the cycle characteristics. Particularly, when these material are mixed and contained, both the discharging capacity and cycle characteristics are improved, which is more preferable.

The nonaqueous solvent further may include any one, or two or more of butylene carbonate, γ-butyrolactone, γ-valerolactone, solvents in which a part or all of hydrogen groups of these compounds are substituted by a fluorine group, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxy acetonitrile, 3-methoxy propionitrile, N,N-dimethyl formamide, N-methylpyrrolizinone, N-methyloxazolidinone, N,N-dimethyl imidazolidinone, nitromethane, nitroethane, sulfolane, dimethyl sulfoxide, or trimethyl phosphate.

Depending on the combination of the electrode, the reversibility of electrode reaction may be improved by using the solvent in which a part or all of hydrogen atoms of the substance contained in the above-described nonaqueous solvent group are substituted by a fluorine atom. Therefore, these substances can be conveniently used.

Lithium salt can be used as the electrolyte salt. Examples of the lithium salt include inorganic lithium salts such as lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium perchlorate ($LiClO_4$), lithium tetrachloroaluminate ($LiAlCl_4$); and perfluoroalkanesulfonate derivatives such as lithium trifluoromethanesulfonate ($LiCF_3SO_3$), lithium bis(trifluoromethanesulfonyl) imide ($LiN(CF_3SO_2)_2$), lithium bis (pentafluoroethanesulfonyl) imide ($LiN(C_2F_5SO_2)_2$), and lithium tris (trifluoromethanesulfonyl) methide ($LiC(CF_3SO_2)_3$). These salts may be used alone or in combination. Among them, lithium hexafluorophosphate ($LiPF_6$) is preferable because a high ion-conductivity can be obtained and cycle characteristics can be improved.

[Method for Producing Nonaqueous Electrolyte Secondary Battery]

The secondary battery may be formed, for example, in the following manner. First, for example, the cathode active material, conductive agent, and binding agent are mixed to prepare a cathode mixture and then the cathode mixture is dispersed in N-methylpyrrolidone to give a cathode mixture slurry. Then, the cathode mixture slurry is applied to the cathode current collector 21A and the solvent is dried, followed by compression molding with a roll presser to form the cathode active material layer 21B. Then, the cathode 21 is fabricated.

Further, for example, the anode active material and the binding agent are mixed to prepare an anode mixture and then the anode mixture is dispersed in N-methyl-pyrrolidone so as to give an anode mixture slurry. Then, the anode mixture slurry is applied to the anode current collector 22A and the solvent is dried, followed by compression molding with a roll presser or the like to form the anode active material layer 22B. Then, the anode 22 is fabricated.

Then, the cathode lead 25 is fixed to the cathode current collector 21A with welding or the like, and the anode lead 26 is fixed to the anode current collector 22A with welding or the like. Thereafter, the cathode 21 and the anode 22 are wound sandwiching the separator 23 therebetween, a tip portion of the cathode lead 25 is welded to the safety valve mechanism 15, a tip portion of the anode lead 26 is welded to the battery can 11, and the wound cathode 21 and anode 22 are sandwiched between a pair of the insulating plates 12 and 13, and then housed inside the battery can 11.

After housing the cathode 21 and anode 22 inside the battery can 11, the electrolytic solution is injected into the battery can 11 to be impregnated into the separator 23. Thereafter, the battery lid 14, the safety valve mechanism 15 and the positive temperature coefficient element 16 are caulked and fixed to an opening end of the battery can 11 through the gasket 17. As described above the secondary battery shown in FIG. 1 can be fabricated.

When the secondary battery is charged, a lithium ion is withdrawn from, for example, the cathode 21 and occluded into the anode 22 via the electrolytic solution. On the other hand, when the secondary battery is discharged, a lithium ion is withdrawn from, for example, the anode 22 and occluded into the cathode 21 via the electrolytic solution.

The use of the cathode active materials allows for satisfying the electrical conductivity of the primary particles in the secondary particles, binding of the secondary particles or binding of the cathode active material layer to the cathode current collector and producing the cathode active material and nonaqueous electrolyte secondary battery which are excellent in high capacity and high-power characteristics.

In such a cathode active material, the average particle diameter of the primary particles as well as the pore diameter of the secondary particles can be measured based on the produced (pressed) cathode, the cathode impregnated with the electrolytic solution or the cathode active material obtained from the cathode given by disassembling the secondary battery after the charging and discharging. After impregnating the cathode active material with the electrolytic solution, the component of the electrolytic solution is evaporated under constantly high temperature atmosphere and thus the structure of the cathode active material can be measured.

EXAMPLES

The present application will be described below with reference to examples according to an embodiment. However, the present application is not to be construed as being limited to these examples.

Example 1

In Example 1, primary particles or secondary particles prepared from the primary particles were used as the cathode active material. When the secondary particles were used, the ratio of the pore diameter of the secondary particles to the average particle diameter of the primary particles was changed to produce secondary batteries and then battery characteristics of the secondary batteries were measured.

With reference to the secondary particles used as the cathode active material, the secondary particles having pore diameters shown in Table 1 as described below were produced using the lithium iron phosphate ($LiFePO_4$) coated with carbon having average particle diameters of 50 nm, 100 nm, 150 nm, 200 nm, 300 nm, and 500 nm as the primary particles. In Examples, the term "average particle diameter of the primary particles" means an average particle diameter of the total diameter of the carbon coated lithium iron phosphate (LiFePO$_4$) including carbon. The secondary particles were granulated by spray drying and the pore diameter of the secondary particles was controlled by adjusting the concentration of solvents for dispersing the primary particles. In Example 1, the average particle diameter of the secondary particles was set to 10 μm.

Here, based on images (sample number n=10) of the primary particles that were observed with the SEM, the average particle diameter of the primary particles was calculated from an average value of the major axes. The pore diameter of the secondary particles was a value measured by "Autopore IV9500" manufactured by Shimadzu Corporation.

TABLE 1

| | | PORE DIAMETER OF SECONDARY PARTICLES [nm] | | | | | | | | |
|---|---|---|---|---|---|---|---|---|---|---|
| | | 11 | 51 | 96 | 150 | 198 | 231 | 270 | 295 | 495 |
| AVERAGE PARTICLE DIAMETER OF PRIMARY PARTICLES [nm] | 50 | ● | ● | — | — | — | — | — | — | — |
| | 100 | ● | ● | ● | — | — | — | — | — | — |
| | 150 | ● | ● | ● | ● | — | — | — | — | — |
| | 200 | ● | ● | ● | ● | ● | — | — | — | — |
| | 300 | ● | ● | ● | ● | ● | ● | ● | ● | — |
| | 500 | ● | ● | ● | ● | ● | — | — | ● | ● |

Hereinafter, each sample will be described in detail.

<Sample 1-1>

[Cathode]

95 parts by mass of secondary particles (B/A=0.02) having a pore diameter of 11 nm prepared from primary particles of lithium iron phosphate (LiFePO$_4$) coated with carbon having an average particle diameter of 500 nm, 2 parts by mass of fibrous carbon as the conductive agent, and 3 parts by mass of polyvinylidene fluoride (PVdF) as the binder were mixed, which was dispersed in an extra amount of N-methyl-2-pyrrolidone to prepare a cathode slurry mixture. The cathode slurry mixture was uniformly applied over both faces of the cathode current collector made of aluminum (Al) having a thickness of 15 μm and dried at 120° C. under reduced pressure for 12 hours, followed by compression molding with a roll presser to form the cathode active material layer. At the time, the press pressure was 650 kgf/cm$^2$. Subsequently, a cathode sheet on which the cathode active material layer was formed was cut into belt-like pieces to form the cathode.

[Anode]

90 parts by mass of artificial graphite and 10 parts by mass of polyvinylidene fluoride (PVdF) as the binder were mixed, which was dispersed in an extra amount of N-methyl-2-pyrrolidone to prepare an anode slurry mixture. The anode slurry mixture was uniformly applied over both faces of the anode current collector made of copper (Cu) having a thickness of 15 μm and dried at 120° C. under reduced pressure for 12 hours, followed by compression molding with a roll presser to form the anode active material layer. Subsequently, an anode sheet on which the anode active material layer was formed was cut into belt-like pieces to form the anode.

[Nonaqueous Electrolyte]

A mixed solvent obtained by mixing ethylene carbonate (EC) and dimethyl carbonate (DMC) at an equivalent volume ratio was used as a nonaqueous solvent. As the electrolyte salt, lithium hexafluorophosphate (LiPF$_6$) was dissolved in the mixed solvent at 1 mol/l.

[Production of Nonaqueous Electrolyte Secondary Battery]

The cathode and the anode were stacked via a fine porous film made of polypropylene (PP) having a thickness of 25 μm and wound to form the spiral electrode body. The spiral electrode body was placed in a metal case having a diameter of 18 mm and a height of 65 mm and the nonaqueous electrolyte was injected thereto. Thereafter, the battery lid connected with a safety valve and the like was caulked and the cylindrical nonaqueous electrolyte secondary battery having a size of 18650 and a capacity of 1000 mAh was produced.

<Sample 1-2>

The cylindrical nonaqueous electrolyte secondary battery was produced in the same manner as described in Sample 1-1 except that secondary particles (B/A=0.04) having a pore diameter of 11 nm prepared from primary particles having an average particle diameter of 300 nm were used as the cathode active material. In this regard, the primary particles are lithium iron phosphate (LiFePO$_4$) coated with carbon. As for the primary particles, a ratio of lithium iron phosphate to carbon is nearly equivalent to that of Sample 1-1 and only the particle diameter is changed. The same holds for the following samples.

<Sample 1-3>

The cylindrical nonaqueous electrolyte secondary battery was produced in the same manner as described in Sample 1-1 except that secondary particles (B/A=0.06) having a pore diameter of 11 mm prepared from primary particles having an average particle diameter of 200 nm were used as the cathode active material.

<Sample 1-4>

The cylindrical nonaqueous electrolyte secondary battery was produced in the same manner as described in Sample 1-1 except that secondary particles (B/A=0.07) having a pore diameter of 11 nm prepared from primary particles having an average particle diameter of 150 nm were used as the cathode active material.

<Sample 1-5>

The cylindrical nonaqueous electrolyte secondary battery was produced in the same manner as described in Sample 1-1 except that secondary particles (B/A 0.10) having a pore diameter of 51 nm prepared from primary particles having an average particle diameter of 500 nm were used as the cathode active material.

<Sample 1-6>

The cylindrical nonaqueous electrolyte secondary battery was produced in the same manner as described in Sample 1-1 except that secondary particles (B/A=0.11) having a pore diameter of 11 nm prepared from primary particles having an average particle diameter of 100 nm were used as the cathode active material and the amounts of the cathode active material, the conductive agent, and the binder were 93 parts by mass, 2 parts by mass, and 5 parts by mass, respectively.

<Sample 1-7>

The cylindrical nonaqueous electrolyte secondary battery was produced in the same manner as described in Sample 1-1 except that secondary particles (B/A=0.17) having a pore diameter of 51 nm prepared from primary particles having an average particle diameter of 300 nm were used as the cathode active material.

<Sample 1-8>

The cylindrical nonaqueous electrolyte secondary battery was produced in the same manner as described in Sample 1-1 except that secondary particles (B/A=0.19) having a pore diameter of 96 nm prepared from primary particles having an average particle diameter of 500 nm were used as the cathode active material. and the amounts of the cathode active material, the conductive agent, and the binder were 94 parts by mass, 2 parts by mass, and 4 parts by mass, respectively.

<Sample 1-9>

The cylindrical nonaqueous electrolyte secondary battery was produced in the same manner as described in Sample 1-1 except that secondary particles (B/A=0.22) having a pore diameter of 11 nm prepared from primary particles having an average particle diameter of 50 nm were used as the cathode active material and the amounts of the cathode active material, the conductive agent, and the binder were 92 parts by mass, 2 parts by mass, and 6 parts by mass, respectively.

<Sample 1-10>

The cylindrical nonaqueous electrolyte secondary battery was produced in the same manner as described in Sample 1-1 except that secondary particles (B/A=0.26) having a pore diameter of 51 nm prepared from primary particles having an average particle diameter of 200 nm were used as the cathode active material and the amounts of the cathode active material, the conductive agent, and the binder were 93 parts by mass, 2 parts by mass, and 5 parts by mass, respectively.

<Sample 1-11>

The cylindrical nonaqueous electrolyte secondary battery was produced in the same manner as described in Sample 1-1 except that secondary particles (B/A=0.30) having a pore diameter of 150 nm prepared from primary particles having an average particle diameter of 500 nm were used as the cathode active material and the amounts of the cathode active material, the conductive agent, and the binder were 93 parts by mass, 2 parts by mass, and 5 parts by mass, respectively.

<Sample 1-12>

The cylindrical nonaqueous electrolyte secondary battery was produced in the same manner as described in Sample 1-1 except that secondary particles (B/A=0.32) having a pore diameter of 96 nm prepared from primary particles having an average particle diameter of 300 nm were used as the cathode active material. and the amounts of the cathode active material, the conductive agent, and the binder were 94 parts by mass, 2 parts by mass, and 4 parts by mass, respectively.

<Sample 1-13>

The cylindrical nonaqueous electrolyte secondary battery was produced in the same manner as described in Sample 1-1 except that secondary particles (B/A=0.34) having a pore diameter of 51 nm prepared from primary particles having an average particle diameter of 150 nm were used as the cathode active material and the amounts of the cathode active material, the conductive agent, and the binder were 94 parts by mass, 2 parts by mass, and 4 parts by mass, respectively.

<Sample 1-14>

The cylindrical nonaqueous electrolyte secondary battery was produced in the same manner as described in Sample 1-1 except that secondary particles (B/A=0.40) having a pore diameter of 198 nm prepared from primary particles having an average particle diameter of 500 nm were used as the cathode active material and the amounts of the cathode active material, the conductive agent, and the binder were 93 parts by mass, 2 parts by mass, and 5 parts by mass, respectively.

<Sample 1-15>

The cylindrical nonaqueous electrolyte secondary battery was produced in the same manner as described in Sample 1-1 except that secondary particles (B/A=0.48) having a pore diameter of 96 nm prepared from primary particles having an average particle diameter of 200 nm were used as the cathode active material and the amounts of the cathode active material, the conductive agent, and the binder were 93 parts by mass, 2 parts by mass, and 5 parts by mass, respectively.

<Sample 1-16>

The cylindrical nonaqueous electrolyte secondary battery was produced in the same manner as described in Sample 1-1 except that secondary particles (B/A=0.50) having a pore diameter of 150 nm prepared from primary particles having an average particle diameter of 300 nm were used as the cathode active material and the amounts of the cathode active material, the conductive agent, and the binder were 92 parts by mass, 2 parts by mass, and 6 parts by mass, respectively.

<Sample 1-17>

The cylindrical nonaqueous electrolyte secondary battery was produced in the same manner as described in Sample 1-1 except that secondary particles (B/A=0.51) having a pore diameter of 51 nm prepared from primary particles having an average particle diameter of 100 nm were used as the cathode active material and the amounts of the cathode active material, the conductive agent, and the binder were 91 parts by mass, 2 parts by mass, and 7 parts by mass, respectively.

<Sample 1-18>

The cylindrical nonaqueous electrolyte secondary battery was produced in the same manner as described in Sample 1-1 except that secondary particles (B/A 0.59) having a pore diameter of 295 nm prepared from primary particles having an average particle diameter of 500 nm were used as the cathode active material and the amounts of the cathode active material, the conductive agent, and the binder were 92 parts by mass, 2 parts by mass, and 6 parts by mass, respectively.

<Sample 1-19>

The cylindrical nonaqueous electrolyte secondary battery was produced in the same manner as described in Sample 1-1 except that secondary particles (B/A=0.64) having a pore diameter of 96 nm prepared from primary particles having an average particle diameter of 150 nm were used as the cathode active material and the amounts of the cathode active material, the conductive agent, and the binder were 93 parts by mass, 2 parts by mass, and 5 parts by mass, respectively.

<Sample 1-20>

The cylindrical nonaqueous electrolyte secondary battery was produced in the same manner as described in Sample 1-1 except that secondary particles (B/A=0.66) having a pore diameter of 198 nm prepared from primary particles having an average particle diameter of 300 nm were used as the cathode active material and the amounts of the cathode active material, the conductive agent, and the binder were 92 parts by mass, 2 parts by mass, and 6 parts by mass, respectively.

<Sample 1-21>

The cylindrical nonaqueous electrolyte secondary battery was produced in the same manner as described in Sample 1-1 except that secondary particles (B/A=0.75) having a pore diameter of 150 nm prepared from primary particles having an average particle diameter of 200 nm were used as the cathode active material and the amounts of the cathode active material, the conductive agent, and the binder were 92 parts by mass, 2 parts by mass, and 6 parts by mass, respectively, <Sample 1-22>

The cathode was produced in the same manner as described in Sample 1-1 except that secondary particles (B/A=0.96) having a pore diameter of 96 nm prepared from primary particles having an average particle diameter of 100 nm as the cathode active material and the amounts of the cathode active material, the conductive agent, and the binder were 86 parts by mass, 2 parts by mass, and 12 parts by mass, respectively. However, the cathode active material layer was separated from the cathode current collector and thus it was difficult to obtain the cylindrical nonaqueous electrolyte secondary battery.

<Sample 1-23>

The cylindrical nonaqueous electrolyte secondary battery was produced in the same manner as described in Sample 1-1 except that secondary particles (B/A=0.98) having a pore diameter of 295 nm prepared from primary particles having an average particle diameter of 300 nm were used as the cathode active material and the amounts of the cathode active material, the conductive agent, and the binder were 88 parts by mass, 2 parts by mass, and 10 parts by mass, respectively.

<Sample 1-24>

The cylindrical nonaqueous electrolyte secondary battery was produced in the same manner as described in Sample 1-1 except that secondary particles (B/A=0.99) having a pore diameter of 198 nm prepared from primary particles having an average particle diameter of 200 nm were used as the cathode active material and the amounts of the cathode active material, the conductive agent, and the binder were 86 parts by mass, 2 parts by mass, and 12 parts by mass, respectively.

<Sample 1-25>

The cylindrical nonaqueous electrolyte secondary battery was produced in the same manner as described in Sample 1-1 except that secondary particles (B/A=0.99) having a pore diameter of 495 nm prepared from primary particles having an average particle diameter of 500 nm were used as the cathode active material and the amounts of the cathode active material, the conductive agent, and the binder were 86 parts by mass, 2 parts by mass, and 12 parts by mass, respectively.

<Sample 1-26>

The cathode was produced in the same manner as described in Sample 1-1 except that secondary particles (B/A=1.00) having a pore diameter of 150 nm prepared from primary particles having an average particle diameter of 150 nm were used as the cathode active material and the amounts of the cathode active material, the conductive agent, and the binder were 86 parts by mass, 2 parts by mass, and 12 parts by mass, respectively. However, the cathode active material layer was separated from the cathode current collector and thus it was difficult to obtain the cylindrical nonaqueous electrolyte secondary battery.

<Sample 1-27>

The cathode was produced in the same manner as described in Sample 1-1 except that secondary particles (B/A=1.02) having a pore diameter of 51 nm prepared from primary particles having an average particle diameter of 50 nm were used as the cathode active material and the amounts of the cathode active material, the conductive agent, and the binder were 87 parts by mass, 2 parts by mass, and 11 parts by mass, respectively. However, the cathode active material layer was separated from the cathode current collector and thus it was difficult to obtain the cylindrical nonaqueous electrolyte secondary battery.

<Sample 1-28>

The cathode was produced in the same manner as described in Sample 1-1 except that primary particles having an average particle diameter of 100 nm were used as the cathode active material and the amounts of the cathode active material, the conductive agent, and the binder were 94 parts by mass, 2 parts by mass, and 4 parts by mass, respectively. However, the cathode active material layer was separated from the cathode current collector and thus it was difficult to obtain the cylindrical nonaqueous electrolyte secondary battery.

<Sample 1-29>

The cathode was produced in the same manner as described in Sample 1-1 except that primary particles having an average particle diameter of 100 nm were used as the cathode active material and the amounts of the cathode active material, the conductive agent, and the binder were 91 parts by mass, 2 parts by mass, and 7 parts by mass, respectively. However, the cathode active material layer was separated from the cathode current collector and thus it was difficult to obtain the cylindrical nonaqueous electrolyte secondary battery.

<Sample 1-30>

The cylindrical nonaqueous electrolyte secondary battery was produced in the same manner as described in Sample 1-1 except that primary particles having an average particle diameter of 100 nm were used as the cathode active material and the amounts of the cathode active material, the conductive agent, and the binder were 88 parts by mass, 2 parts by mass, and 10 parts by mass, respectively.

<Sample 1-31>

The cylindrical nonaqueous electrolyte secondary battery was produced in the same manner as described in Sample 1-1 except that primary particles having an average particle diameter of 100 nm were used as the cathode active material and the amounts of the cathode active material, the conductive agent, and the binder were 86 parts by mass, 2 parts by mass, and 12 parts by mass, respectively.

<Sample 1-32>

91 parts by mass of a secondary particle (B/A 0.77) with a pore diameter of 231 nm produced from a primary particle of lithium iron phosphate ($LiFePO_4$) coated with carbon having an average particle diameter of 300 nm, 2 parts by mass of fibrous carbon as a conductive agent and 7 parts by mass of polyvinylidene fluoride (PVdF) as a binder were mixed and then dispersed in an extra amount of N-methyl-2-pyrrolidone to prepare a cathode slurry mixture. The cathode slurry mixture was uniformly applied over both faces of a cathode current collector made of aluminum (Al) foil having a thickness of 15 μm and dried at 120° C. under reduced pressure for 12 hours, followed by compression molding with a roll presser to form a cathode active material layer. At that time, the press pressure was 650 kgf/cm$^2$. Next, the cathode sheet on which the cathode active material layer was formed was cut into belt-like pieces to form a cathode.

<Sample 1-33>

90 parts by mass of a secondary particle (B/A=0.90) with a pore diameter of 270 nm produced from a primary particle of lithium iron phosphate ($LiFePO_4$) coated with carbon having an average particle diameter of 300 nm, 2 parts by mass of fibrous carbon as a conductive agent and 8 parts by mass of polyvinylidene fluoride (PVdF) as a binder were mixed and then dispersed in an extra amount of N-methyl-2-pyrrolidone to prepare a cathode slurry mixture. The cathode slurry mixture was uniformly applied over both faces of a cathode current collector made of aluminum (Al) foil having a thickness of 15 μm and dried at 120° C. under reduced pressure for 12 hours, followed by compression molding with a roll presser to form a cathode active material layer. At that time, the press pressure was 650 kgf/cm$^2$. Next, the cathode sheet on which the cathode active material layer was formed was cut into belt-like pieces to form a cathode.

[Evaluation of Discharging Capacity]
(a) Measurement of Discharging Capacity at 0.1 A With reference to each sample of the cylindrical nonaqueous electrolyte secondary batteries thus produced, the charging was performed at a constant current of 1 A until the battery voltage reached to 3.6 V. Thereafter, the charging was performed at a constant voltage of 3.6 V until the charging current reached 0.1 A. Then, the charging was performed at a constant current of 0.1 A until the battery voltage reached to 2.0 V and the discharging capacity at 0.1 A was measured.

(b) Measurement of Discharging Capacity at 5 A

With reference to each sample of the cylindrical nonaqueous electrolyte secondary batteries thus produced, the charging was performed in the same manner as described in (a). Then, the charging was performed at a constant current of 5 A until the battery voltage reached to 2.0 V and the discharging capacity at 5 A was measured.

With reference to the batteries in which the cathode active material layer was separated from the cathode current collector when they were pressed at the above described pressure, the measurements of discharging capacity as described in (a) and (b) were not performed.

Evaluation results of Sample 1-1 to Sample 1-31 are shown in Table 2. In Table 2, the batteries in which the measurements of discharging capacity could not be performed due to the separating of the cathode active material layer were indicated by "—".

TABLE 2

| | CATHODE ACTIVE MATERIAL | | | | | | | |
|---|---|---|---|---|---|---|---|---|
| | PARTICLE DIAMETER OF PRIMARY PARTICLES [nm] | PORE DIAMETER OF SECONDARY PARTICLES [nm] | RATIO OF PORE DIAMETER OF SECONDARY PARTICLES TO AVERAGE PARTICLE DIAMETER OF PRIMARY PARTICLES (B/A) | MIXED QUANTITY [PART BY MASS] | CONDUCTIVE AGENT MIXED QUANTITY [PART BY MASS] | BINDER MIXED QUANTITY [PART BY MASS] | DISCHARGING CAPACITY AT 0.1 A [mAh] | DISCHARGING CAPACITY AT 5 A [mAh] |
| SAMPLE 1-1 | 500 | 11 | 0.02 | 95 | 2 | 3 | 908 | 715 |
| SAMPLE 1-2 | 300 | 11 | 0.04 | 95 | 2 | 3 | 912 | 705 |
| SAMPLE 1-3 | 200 | 11 | 0.06 | 95 | 2 | 3 | 923 | 708 |
| SAMPLE 1-4 | 150 | 11 | 0.07 | 95 | 2 | 3 | 918 | 738 |
| SAMPLE 1-5 | 500 | 51 | 0.10 | 95 | 2 | 3 | 1020 | 942 |
| SAMPLE 1-6 | 100 | 11 | 0.11 | 93 | 2 | 5 | 1005 | 943 |
| SAMPLE 1-7 | 300 | 51 | 0.17 | 95 | 2 | 3 | 1020 | 935 |
| SAMPLE 1-8 | 500 | 96 | 0.19 | 94 | 2 | 4 | 1002 | 935 |
| SAMPLE 1-9 | 50 | 11 | 0.22 | 92 | 2 | 6 | 1013 | 952 |
| SAMPLE 1-10 | 200 | 51 | 0.26 | 93 | 2 | 5 | 1011 | 940 |
| SAMPLE 1-11 | 500 | 150 | 0.30 | 93 | 2 | 5 | 1005 | 930 |
| SAMPLE 1-12 | 300 | 96 | 0.32 | 94 | 2 | 4 | 1012 | 920 |
| SAMPLE 1-13 | 150 | 51 | 0.34 | 94 | 2 | 4 | 1021 | 946 |
| SAMPLE 1-14 | 500 | 198 | 0.40 | 93 | 2 | 5 | 1010 | 920 |
| SAMPLE 1-15 | 200 | 96 | 0.48 | 93 | 2 | 5 | 1006 | 945 |
| SAMPLE 1-16 | 300 | 150 | 0.50 | 92 | 2 | 6 | 1008 | 938 |
| SAMPLE 1-17 | 100 | 51 | 0.51 | 91 | 2 | 7 | 1007 | 938 |
| SAMPLE 1-18 | 500 | 295 | 0.59 | 92 | 2 | 6 | 1008 | 950 |
| SAMPLE 1-19 | 150 | 96 | 0.64 | 93 | 2 | 5 | 1023 | 952 |
| SAMPLE 1-20 | 300 | 198 | 0.66 | 92 | 2 | 6 | 1010 | 940 |
| SAMPLE 1-21 | 200 | 150 | 0.75 | 92 | 2 | 6 | 1014 | 938 |
| SAMPLE 1-22 | 100 | 96 | 0.96 | 86 | 2 | 12 | — | — |
| SAMPLE 1-23 | 300 | 295 | 0.98 | 88 | 2 | 10 | 1005 | 750 |
| SAMPLE 1-24 | 200 | 198 | 0.99 | 86 | 2 | 12 | 1003 | 716 |
| SAMPLE 1-25 | 500 | 495 | 0.99 | 86 | 2 | 12 | 1003 | 720 |
| SAMPLE 1-26 | 150 | 150 | 1.00 | 86 | 2 | 12 | — | — |
| SAMPLE 1-27 | 50 | 51 | 1.02 | 87 | 2 | 11 | — | — |
| SAMPLE 1-28 | 100 | — | — | 94 | 2 | 4 | — | — |
| SAMPLE 1-29 | 100 | — | — | 91 | 2 | 7 | — | — |
| SAMPLE 1-30 | 100 | — | — | 88 | 2 | 10 | 1002 | 600 |
| SAMPLE 1-31 | 100 | — | — | 86 | 2 | 12 | 1005 | 526 |
| SAMPLE 1-32 | 300 | 231 | 0.77 | 91 | 2 | 8 | 1010 | 842 |
| SAMPLE 1-33 | 300 | 270 | 0.90 | 90 | 2 | 7 | 1005 | 820 |

From the above-mentioned results, in the case of Sample 1-1 to Sample 1-4 in which the ratio B/A of the pore diameter B of the secondary particles to the average particle diameter A of the primary particles was less than 0.10, the discharging capacity at 0.1 A was 908 mAh to 923 mAh. In each Sample whose B/A ratio was 0.10 or more, the discharging capacity at 0.1 A exceeded 1000 mAh. It was found that the discharging capacity was reduced by up to 100 mAh.

In addition, it was found that when the ratio B/A of the average particle diameter A of primary particles to the pore diameter B of a secondary particle exceeded 0.9, the discharging capacity at 5 A became about 700 mAh, which was decreased by about 200 mAh as compared to the case where the ratio B/A was 0.75 or less, and that even when the ratio B/A was more than 0.75 and 0.9 or less the discharging capacity at 5 A became about 800 mAh, which was decreased by about 100 mAh compared to the case where the ratio B/A was 0.75 or less.

Further, the discharging capacity at 5 A was 715 mAh to 738 mAh. For example, the discharging capacity was reduced as low as about 200 mAh when compared to that of Sample 1-5 whose B/A was 0.10.

This is because the pore diameter of the secondary particles was smaller than the average particle diameter of the primary particles and the electrolytic solution was not sufficiently penetrated to the cathode active material, and thus the battery reaction in the cathode became insufficient and the discharging capacity was decreased.

In the case of Samples 1-23 to 1-25 where the ratio B/A of the pore diameter B of the secondary particles to the average particle diameter A of the primary particles exceeded 0.75, the discharging capacity at 0.1 A was hardly reduced, however, the discharging capacity at 5 A was reduced as low as from 716 mAh to 750 mAh.

This is because the pore diameter of the secondary particles was larger than the average particle diameter of the primary particles and the binder entered into pores of the secondary particles and thus the resistance among the primary particles constituting the secondary particles became higher. Therefore, it is considered that a large effect was not observed during discharging at a relatively low load as in the case of discharging at 0.1 A, however, load characteristics were reduced during heavy load discharging as in the case of discharging at 5 A and thus the above described results were obtained.

Similarly, when the ratio B/A of the pore diameter B of the secondary particles to the average particle diameter A of the primary particles exceeded 0.75, the cathode active material layer was separated from the cathode current collector in Samples 1-22, 1-26, and 1-27 and thus the batteries could not be produced. This is because the binder entered into pores of the secondary particles and thus the amount of the binder used for binding of the secondary particles (cathode active material) or binding of the conductive agents, binding of the secondary particles to the conductive agent, or binding of the secondary particles and the conductive agent to the cathode current collector was decreased and their binding capacities were decreased.

When the primary particles were used as the cathode active material, the cathode active material layer was separated from the cathode current collector in Samples 1-28 and 1-29 where the mixed quantity of the binder was less than 10 parts by mass due to little amount of the binder. In the case of Samples 1-30 and 1-31 where the mixed quantity of the binder was 10 parts by mass or more, the discharging capacity at 0.1 A was hardly reduced, however, the discharging capacity at 5 A was reduced as low as 600 mAh. In Sample 1-31, the mixed quantity of the binder was excessive and thus the discharging capacity was greatly reduced as compared to that of Sample 1-30 during heavy load discharging.

This is because when the primary particles are bound with the binder or the primary particles and the conductive agent are bound with the binder, more binder is necessary since the average particle diameter of the primary particles is very small. Although when the secondary particles are used as the cathode active material, the cathode can be produced even if the mixed quantity of the binder is about 3 parts by mass, it is necessary to mix 10 parts by mass or more of binder with the primary particles. Thus, the mixed quantity of the cathode active material was reduced, thereby causing the reduction of the discharging capacity.

The average particle diameter of the primary particles is small. Therefore, when the cathode active material layer of the same thickness is formed, the contact area of the particles is increased as compared to the case where the secondary particles are used. Since the contact area of the primary particles is bound with the binder, a large amount of the binder is present on the conductive path. Thus, the discharging capacity was greatly reduced, particularly during heavy load discharging.

From such results, it was found that the mixed quantity of the binder could be decreased by not only forming secondary particles from the cathode active material but also adjusting the secondary particles so that the ratio B/A of the pore diameter B of the secondary particles to the average particle diameter A of the primary particles was 0.10 or more and 0.90 or less, more preferably 0.10 or more and 0.75 or less and excellent load characteristics could be obtained in both cases (during light or heavy load discharging).

Example 2

In Example 2, primary particles or secondary particles prepared from the primary particles were used as the cathode active material. The thickness of the cathode active material layer was changed at a constant volume density to produce secondary batteries and then a DC resistance of the secondary batteries was measured.

In this regard, the average particle diameter of the primary particles as well as the pore diameter of the secondary particles used in Example 2 were measured in the same manner as described in Example 1.

<Sample 2-1>

93 parts by mass of secondary particles (B/A=0.50) having a pore diameter of 150 nm prepared from primary particles of lithium iron phosphate coated with carbon having an average particle diameter of 300 nm, 2 parts by mass of fibrous carbon as the conductive agent, and 5 parts by mass of polyvinylidene fluoride (PVdF) as the binder were mixed, which was dispersed in an extra amount of N-methyl-2-pyrrolidone to prepare a cathode slurry mixture. The cathode slurry mixture was uniformly applied over both faces of the cathode current collector made of aluminum (Al) foil having a thickness of 15 µm and dried at 120° C. under reduced pressure for 12 hours, followed by compression molding with a roll presser to form the cathode active material layer. At that time, the volume density of the cathode active material layer was 2.1 g/cc and the total thickness of the cathode was 50 µm. Subsequently, a cathode sheet on which the cathode active material layer was formed was cut into belt-like pieces to form the cathode.

[Anode]

90 parts by mass of artificial graphite and 10 parts by mass of polyvinylidene fluoride (PVdF) as the binder were mixed, which was dispersed in an extra amount of N-methyl-2-pyrrolidone to prepare an anode slurry mixture. The anode slurry mixture was uniformly applied over both faces of the anode current collector made of copper (Cu) having a thickness of 15 μm and dried at 120° C. under reduced pressure for 12 hours, followed by compression molding with a roll presser to form the anode active material layer. At that time, the volume density of the cathode active material layer was 2.1 g/cc and the total thickness of the anode was adjusted so that the battery capacity was 1000 mAh depending on the cathode. Subsequently, an anode sheet on which the anode active material layer was formed was cut into belt-like pieces to form the anode.

[Production of Nonaqueous Electrolyte Secondary Battery]

The cathode and the anode were stacked via a fine porous film made of polypropylene (PP) having a thickness of 25 μm and wound to form the spiral electrode body. The spiral electrode body was placed in a metal case having a diameter of 18 mm and a height of 65 mm and the same nonaqueous electrolyte as that of Example 1 was injected thereto. Thereafter, the battery lid connected with a safety valve and the like was caulked and the cylindrical nonaqueous electrolyte secondary battery having a size of 18650 and a capacity of 1000 mAh was produced.

<Sample 2-2>

The cylindrical nonaqueous electrolyte secondary battery was produced in the same manner as described in Sample 2-1 except that the total thickness of the cathode was 100 μm.

<Sample 2-3>

The cylindrical nonaqueous electrolyte secondary battery was produced in the same manner as described in Sample 2-1 except that the total thickness of the cathode was 150 μm.

<Sample 2-4>

The cylindrical nonaqueous electrolyte secondary battery was produced in the same manner as described in Sample 2-1 except that primary particles of lithium iron phosphate coated with carbon having an average particle diameter of 300 nm were used as the cathode active material.

<Sample 2-5>

The cylindrical nonaqueous electrolyte secondary battery was produced in the same manner as described in Sample 2-1 except that primary particles of lithium iron phosphate coated with carbon having an average particle diameter of 300 nm were used as the cathode active material and the total thickness of the cathode was 100 μm.

<Sample 2-6>

The cylindrical nonaqueous electrolyte secondary battery was produced in the same manner as described in Sample 2-1 except that primary particles of lithium iron phosphate coated with carbon having an average particle diameter of 300 nm were used as the cathode active material and the total thickness of the cathode was 150 μm.

<Sample 2-7>

The cylindrical nonaqueous electrolyte secondary battery was produced in the same manner as described in Sample 2-1 except that the conductive agent used for the cathode was a spherical carbon.

<Sample 2-8>

The cylindrical nonaqueous electrolyte secondary battery was produced in the same manner as described in Sample 2-1 except that the conductive agent used for the cathode was the spherical carbon and the total thickness of the cathode was 100 μm <Sample 2-9>

The cylindrical nonaqueous electrolyte secondary battery was produced in the same manner as described in Sample 2-1 except that the conductive agent used for the cathode was the spherical carbon and the total thickness of the cathode was 150 μm.

<Sample 2-10>

The cylindrical nonaqueous electrolyte secondary battery was produced in the same manner as described in Sample 2-1 except that the conductive agent used for the cathode was the spherical carbon and primary particles of lithium iron phosphate coated with carbon having an average particle diameter of 300 nm were used as the cathode active material.

<Sample 2-11>

The cylindrical nonaqueous electrolyte secondary battery was produced in the same manner as described in Sample 2-1 except that the conductive agent used for the cathode was the spherical carbon, primary particles of lithium iron phosphate coated with carbon having an average particle diameter of 300 nm were used as the cathode active material, and the total thickness of the cathode was 100 μm.

<Sample 2-12>

The cylindrical nonaqueous electrolyte secondary battery was produced in the same manner as described in Sample 2-1 except that the conductive agent used for the cathode was the spherical carbon, primary particles of lithium iron phosphate coated with carbon having an average particle diameter of 300 nm were used as the cathode active material, and the total thickness of the cathode was 150 μm.

[Measurement of DC Resistance]

With reference to each sample of the cylindrical nonaqueous electrolyte secondary batteries thus produced, the charging was performed at a constant current of 1 A until the battery voltage reached to 3.6 V. Thereafter, when electric currents were applied for 10 seconds at 5 A, 10 A, 15 A, and 20 A, respectively in the condition where the secondary batteries were charged at 50%, each voltage value was measured. Then, the slope of the line obtained by plotting the measured voltage value and current value was defined as the DC resistance (DCR) and calculation was performed.

Figure 3:
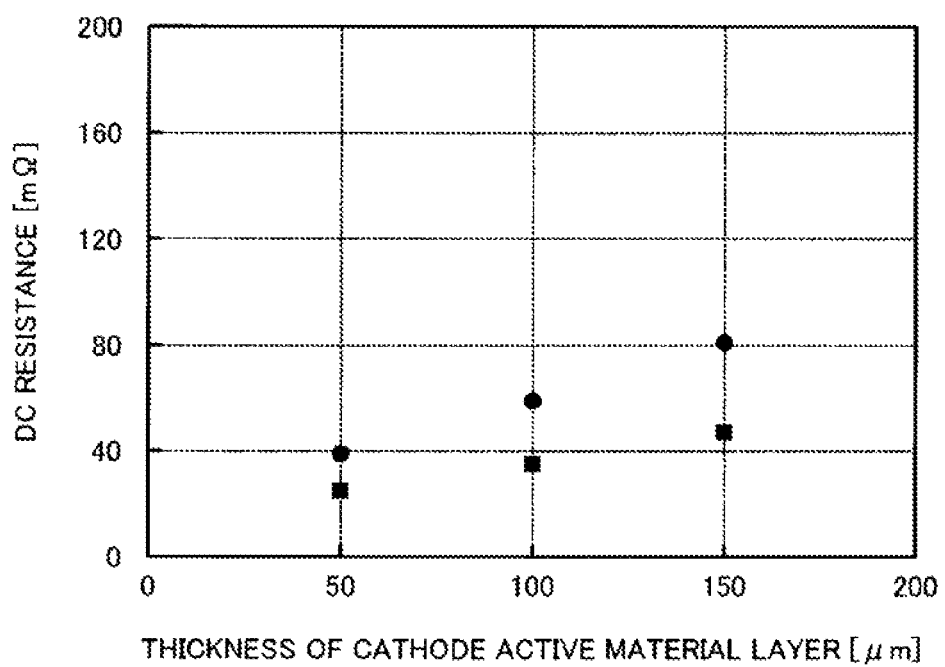
FIG. 3 is a graph showing evaluation results of Example 2.
Figure 4:
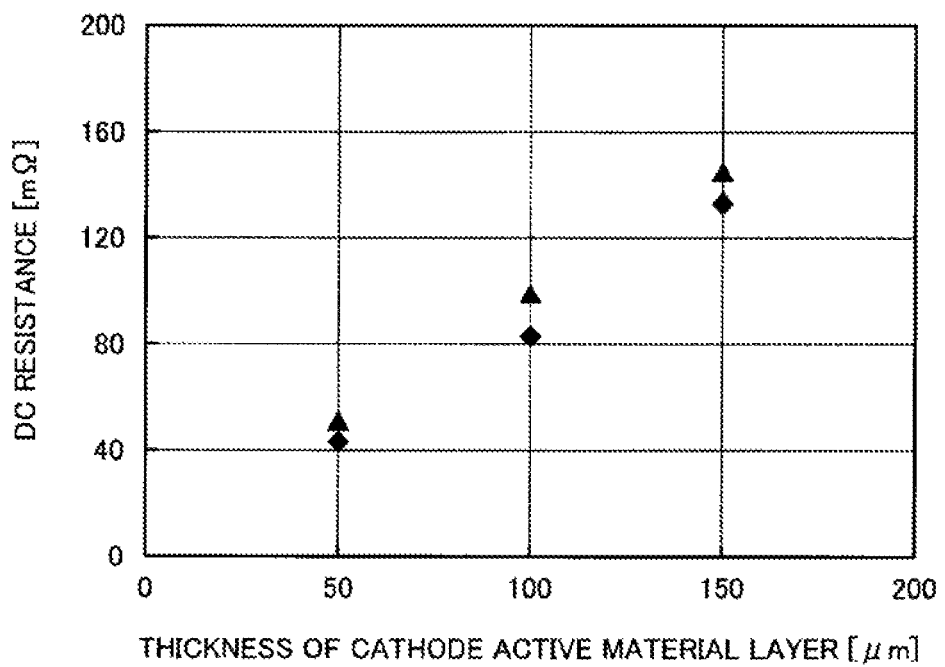
FIG. 4 is a graph showing evaluation results of Example 2.

Evaluation results of Sample 2-1 to Sample 2-12 are shown in Table 3. The relation between the thickness of the cathode active material layer and the DC resistance (DCR) is shown in FIGS. 3 and 4. FIG. 3 shows the results of Samples 2-1 to 2-6 where fibrous carbon was used as the conductive agent. In the graph, "square" marks show the results of Samples 2-1 to 2-3 where the secondary particles were used as the cathode active material and "round" marks show the results of Samples 2-4 to 2-6 where primary particles were used as the cathode active material. FIG. 4 shows the results of Samples 2-7 to 2-12 where the spherical carbon was used as the conductive agent. In the graph, "rhombic" marks show the results of Samples 2-7 to 2-9 where the secondary particles were used as the cathode active material and "triangular" marks show the results of Samples 2-10 to 2-12 where primary particles were used as the cathode active material.

TABLE 3

| | CATHODE ACTIVE MATERIAL | | | | CONDUCTIVE AGENT | | BINDER | THICK- | |
| --- | --- | --- | --- | --- | --- | --- | --- | --- | --- |
| | PARTICLE DIAMETER OF PRIMARY PARTICLES [nm] | PORE DIAMETER OF SECONDARY PARTICLES [nm] | RATIO OF PORE DIAMETER OF SECONDARY PARTICLES TO AVERAGE PARTICLE DIAMETER OF PRIMARY PARTICLES (B/A) | MIXED QUANTITY [PART BY MASS] | SHAPE | MIXED QUANTITY [PART BY MASS] | MIXED QUANTITY [PART BY MASS] | NESS OF CATHODE [μm] | DCR [mΩ] |
| SAMPLE 2-1 | 300 | 150 | 0.50 | 93 | FIBROUS | 2 | 5 | 50 | 25 |
| SAMPLE 2-2 | 300 | 150 | 0.50 | 93 | FIBROUS | 2 | 5 | 100 | 36 |
| SAMPLE 2-3 | 300 | 150 | 0.50 | 93 | FIBROUS | 2 | 5 | 150 | 47 |
| SAMPLE 2-4 | 300 | — | — | 93 | FIBROUS | 2 | 5 | 50 | 38 |
| SAMPLE 2-5 | 300 | — | — | 93 | FIBROUS | 2 | 5 | 100 | 58 |
| SAMPLE 2-6 | 300 | — | — | 93 | FIBROUS | 2 | 5 | 150 | 82 |
| SAMPLE 2-7 | 300 | 150 | 0.50 | 93 | SPHERICAL | 2 | 5 | 50 | 42 |
| SAMPLE 2-8 | 300 | 150 | 0.50 | 93 | SPHERICAL | 2 | 5 | 100 | 82 |
| SAMPLE 2-9 | 300 | 150 | 0.50 | 93 | SPHERICAL | 2 | 5 | 150 | 132 |
| SAMPLE 2-10 | 300 | — | — | 93 | SPHERICAL | 2 | 5 | 50 | 50 |
| SAMPLE 2-11 | 300 | — | — | 93 | SPHERICAL | 2 | 5 | 100 | 96 |
| SAMPLE 2-12 | 300 | — | — | 93 | SPHERICAL | 2 | 5 | 150 | 144 |

As is apparent from the results of Table 3 and FIG. 3, it was found that when the cathode active material layer was the same thickness in the batteries using fibrous carbon as the conductive agent, the DC resistance of the secondary batteries using the secondary particles as the cathode active material was lower than that of the secondary batteries using the primary particles as the cathode active material. Further, the DC resistance of the secondary batteries using the secondary particles as the cathode active material was significantly low even when the electrode thickness was increased. In Samples 2-3 and 2-6 where the cathode thickness was 150 μm, the DC resistance decreased by about 40%.

As is apparent from the results of Table 3 and FIG. 4, it was found that when the cathode active material layer was the same thickness in the batteries using the spherical carbon as the conductive agent, the DC resistance of the secondary batteries using the secondary particles as the cathode active material was lower than that of the secondary batteries using the primary particles as the cathode active material.

As is apparent from FIGS. 3 and 4, it was found that an increase of the DC resistance (DCR) in a thickness direction of the cathode when fibrous carbon was used as the conductive agent was smaller than that when granular carbon was used.

As is apparent from those results, it was found that the secondary battery having high battery capacity and high load characteristics could be efficiently produced by using secondary particles of the structure of the present application as the cathode active material and fibrous carbon as the conductive agent.

It should be understood by those skilled in the art that various modifications, combinations, sub-combinations and alterations may occur depending on design requirements and other factors insofar as they are within the scope of the appended claims or the equivalents thereof.

For example, the numerical values described in the embodiments are merely examples and different numerical values from those may be used if necessary.

Although LiFePO$_4$ was used as the primary particles in Examples, the effect of the present application was caused by the average particle diameter of the primary particles and the pore diameter of the secondary particles. It should be noted that it is not limited to the compositions of Examples. Other cathode active materials having the olivine structure represented by LiM$_x$PO$_4$ (0≤x≤1.0) can be used as the primary particles. For example, the compound represented by Chemical Formula II which is a compound obtained by substituting a part of iron by other elements for the structural stability can also be used.

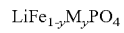

LiFe$_{1-y}$M$_y$PO$_4$     (Chemical Formula II)

(wherein, M is at least one selected from the group including cobalt (Co), manganese (Mn), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). y is, for example, 0<y<1.0.)

Here, an example using LiFe$_{0.3}$Mn$_{0.7}$PO$_4$ as a primary particle will be described.

<Sample 3-1>

94 parts by mass of a secondary particle (B/A 0.32) with a pore diameter of 96 nm produced from a primary particle of lithium iron phosphate (LiFe$_{1-y}$Mn$_y$PO$_4$, y=0.7) coated with carbon having an average particle diameter of 300 nm, 2 parts by mass of fibrous carbon as a conductive agent and 4 parts by mass of polyvinylidene fluoride (PVdF) as a binder were mixed and then dispersed in an extra amount of N-methyl-2-pyrolidone to prepare a cathode slurry mixture. The cathode slurry mixture was uniformly applied over both faces of a cathode current collector made of aluminum (Al) foil having a thickness of 15 μm and dried at 120° C. under reduced pressure for 12 hours, followed by compression molding with a roll presser to form a cathode active material layer. At that time, the press pressure was 650 kgf/cm$^2$. Next, the cathode sheet on which the cathode active material layer was formed was cut into belt-like pieces to form a cathode. The anode, electrolytic solution, and battery structure were made to be the same as the case of LiFePO$_4$.

The charging capacity at 0.1 A was 1012 mAh and the charging capacity at 5.0 A was 910 mAh.

Further, the present application can be applied to not only the secondary battery having a cylindrical shape but also various types of batteries such as a secondary battery having a square shape and a thin battery whose outer face is made of a laminate film and the like. Furthermore, the present application can be applied to not only the secondary batteries but also primary batteries. Further, the present application can be applied to not only a battery using a so-called wound-type electrode in which band shapes as a cathode and an anode are wound in a superimposed state via a separator, but also a battery using a so-called stack-type electrode in which a separator is inserted between planar cathode and anode and they are stacked can be made.

Here, an example of a battery using a stack-type electrode will be described.

<Sample 4-1>

Figure 5:
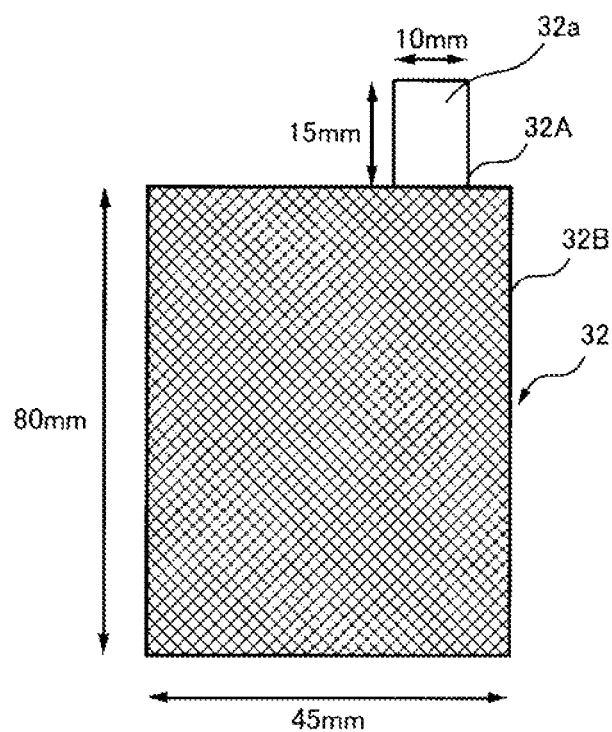
FIG. 5 is a plan view showing an anode used for a stack-type electrode body of a nonaqueous electrolyte battery according to another embodiment.

90 parts by mass of artificial graphite and 10 parts by mass of polyvinylidene fluoride and an extra quantity of N-methylpyrrolidone were kneaded to obtain an anode mixture coating material. This was applied over both faces of a copper foil (anode current collector 32A as shown in FIG. 5) having a thickness of 15 μm and dried and then pressed to form an anode active material layer 32B. At that time, a portion of about 30 mm the copper foil of which was exposed was left to be an anode current collector exposed portion 32a. In this case, the applied ends of both faces were made on the same line. This was cut into a shape as shown in FIG. 5 to obtain an anode 32.

Figure 6:
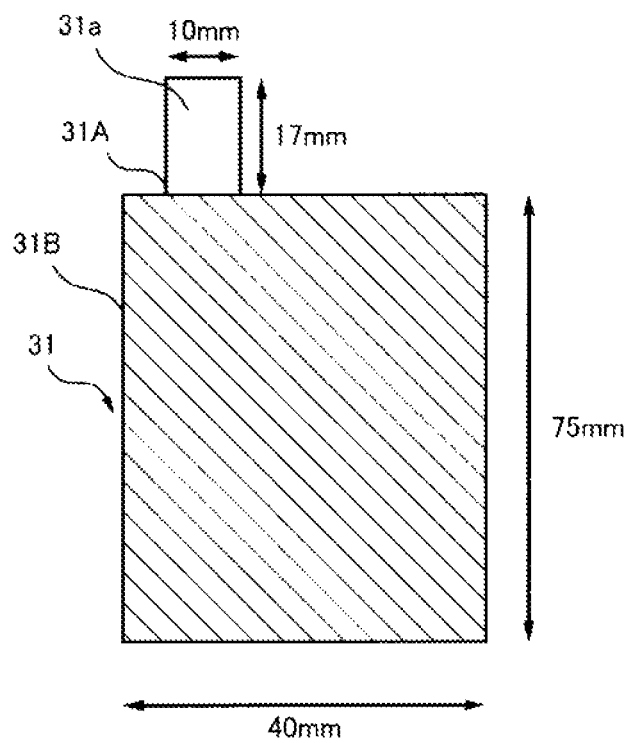
FIG. 6 is a plan view showing a cathode used for a stack-type electrode body of a nonaqueous electrolyte battery according to: another embodiment.

94 parts by mass of a secondary particle (B/A=0.19) with a pore diameter of 96 nm produced from a primary particle of lithium iron phosphate (LiFePO$_4$) coated with carbon having an average particle diameter of 500 nm, 2 parts by mass of fibrous carbon as a conductive agent and 4 parts by mass of polyvinylidene fluoride (PVdF) as a binder were mixed and then dispersed in an extra amount of N-methyl-2-pyrrolidone to prepare a cathode slurry mixture. The cathode slurry mixture was uniformly applied over both faces of an aluminum (Al) foil (cathode current collector 31A as shown in FIG. 6) having a thickness of 15 μm and dried and pressed to form a cathode active material layer 31B. At that time, a portion of about 30 mm the aluminum foil of which was exposed was left to make a cathode current collector exposed portion 31a. In this case, the applied ends of both faces were made on the same line. This was cut into a shape as shown in FIG. 6 to obtain a cathode 31.

Upon applying the anode active material layer 32B and the cathode active material layer 31B to the anode current collector 32A and the cathode current collector 31A respectively and forming, the lithium occluding ability per weight of the anode mixture and the lithium releasing ability per weight of the cathode mixture were measured in advance and then the lithium occluding ability per unit area of the anode mixture layer was made so as not to exceed the lithium releasing ability per unit area of the anode mixture layer.

Figure 7:
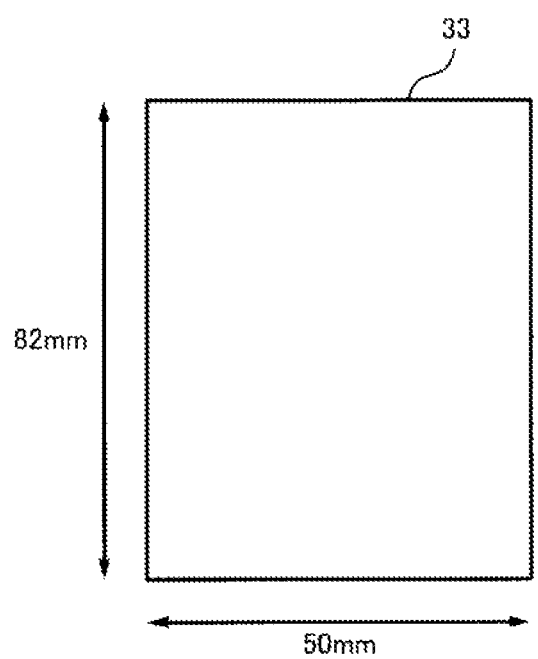
FIG. 7 is a plan view showing a separator used for a stack-type electrode body of a nonaqueous electrolyte battery according to another embodiment.

A polypropylene porous film having a thickness of 25 μm was cut into a shape as shown in FIG. 7, which was made to be a separator 33.

Figure 8:
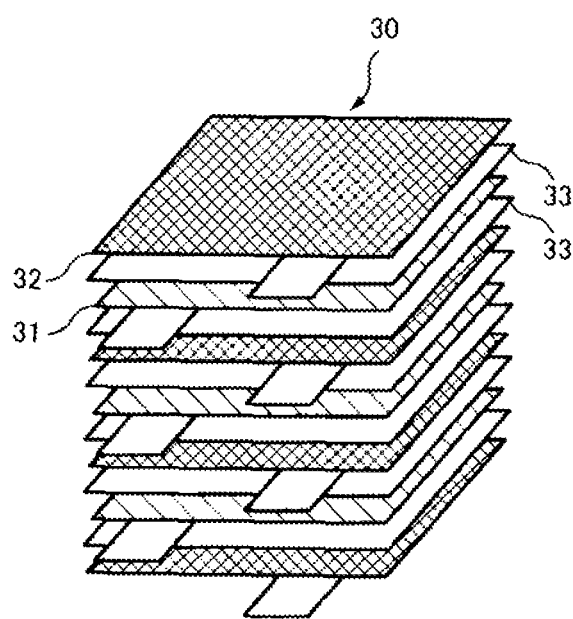
FIG. 8 is a schematic exploded perspective view showing a stack-type electrode body of a nonaqueous electrolyte battery according to another embodiment.

The 10 both face-coated anodes 32, the 9 both coated cathodes 31, and the 18 separators 33, obtained in this manner, were stacked, as schematically shown in FIG. 8, in the order the anode 32, the separator 33, the cathode 31, the separator 33, the anode 32, the separator 33, the cathode 31, the separator 33, the anode 31, . . . , the separator 33 and the anode 32. Accordingly, a battery element (stack-type electrode body) 30 involving 18 stack basic units of a cathode active material layer 31B, a separator and an anode active material layer 32B was obtained. In addition, at that time, although placed on the outermost layer of a battery element 30, an anode active material layer 32B does not contribute to battery reaction because it does not face the cathode 31.

Additionally, upon this stack operation, the cathode 31 and the anode 32, when viewed from the stack direction, were adjusted in their relative positions and stacked such that the surface of the cathode active material layer 31B was held inside the surface of the anode active material layer 32B. Thereafter, the 9 cathode current collector exposed portions 31a were welded by supersonic waves to an aluminum cathode current collecting lead. Moreover, the 10 anode current collector exposed portions 32a were welded by supersonic waves to a nickel anode current collecting lead.

A nonaqueous electrolytic solution prepared by dissolving LiPF$_6$ in a mixed solution of equal volumes of ethylene carbonate (EC) and dimethyl carbonate (DMC) such that the concentration of LiPF$_6$ was 1 mol/l was used. This nonaqueous electrolytic solution was impregnated in the battery element 30 and then the battery element 30 was sealed by thermal fusion bonding under reduced pressure by use of an aluminum laminate film covering material made from a resin layer, an aluminum layer and a resin layer. At the time, the cathode lead and the anode lead were rendered outside the covering material via the thermal fusion bonded portion and made to be a cathode terminal and an anode terminal. In this manner, a test battery having a design capacity of 1000 mAh was fabricated.

The discharging capacity at 0.1 A was 1003 mAh and the discharging capacity at 0.5 A was 980 mAh.

<Sample 4-2>

A stack-type nonaqueous electrolyte secondary battery was produced in the same manner as described in Sample 4-1 except that a primary particle having an average particle diameter of 100 m was used as the cathode active material, and that the amounts of the cathode active material, the conductive agent, and the binder were respectively 86 parts by mass, 2 parts by mass, and 12 parts by mass.

The discharging capacity at 0.1 A was 1001 mAh and the charging capacity at 0.5 A was 550 mAh.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonaqueous electrolyte secondary battery comprising:
a cathode having a cathode active material layer;
an anode; and
a nonaqueous electrolyte, wherein:
the cathode active material layer includes secondary particles constituted by primary particles;
the primary particles are carbon material-coated lithium phosphate compound particles;
an average particle diameter A of primary particles is 50 nm or more and 500 nm or less;
a ratio B/A of a pore diameter B of the secondary particles to the average particle diameter A of the primary particles is 0.10 or more and 0.75 or less;
the average diameter A is an average particle diameter of a total diameter of the carbon-coated lithium phosphate compound particles including carbon, and
the pore diameter B is a diameter of a void present between the carbon-coated lithium phosphate compound particles.

2. The nonaqueous electrolyte secondary battery according to claim 1, wherein the cathode active material layer contains a fibrous carbon.

3. A cathode active material comprising:
secondary particles constituted by primary particles; wherein:
the primary particles are carbon material-coated lithium phosphate compound particles,
an average particle diameter A of the primary particles is 50 nm or more and 500 nm or less and a ratio B/A of a pore diameter B of the secondary particles to the average particle diameter A of the primary particles is 0.10 or more and 0.75 or less,
the average diameter A is an average particle diameter of a total diameter of the carbon-coated lithium phosphate compound particles including carbon, and the pore diameter B is a diameter of a void present between the carbon-coated lithium phosphate compound particles.

4. A cathode comprising:
a cathode active material which contains secondary particles constituted by primary particles, wherein:
the primary particles are carbon material-coated lithium phosphate compound particles,
an average particle diameter A of the primary particles is 50 nm or more and 500 nm or less and a ratio B/A of a pore diameter B of the secondary particles to the average particle diameter A of the primary particles is 0.10 or more and 0.75 or less,
the average diameter A is an average particle diameter of a total diameter of the carbon-coated lithium phosphate compound particles including carbon, and
the pore diameter B is a diameter of a void present between the carbon-coated lithium phosphate compound particles.

5. The nonaqueous electrolyte secondary battery according to claim 1, wherein the pore diameter B is 11 nm or more and 295 nm or less.

6. The cathode active material according to claim 3, wherein the pore diameter B is 11 nm or more and 295 nm or less.

7. The cathode according to claim 4, wherein the pore diameter B is 11 nm or more and 295 nm or less.

8. The nonaqueous electrolyte secondary battery according to claim 1, wherein the cathode active material layer comprises a conductive agent selected from the group consisting of: fibrous carbon, spherical carbon and carbon black.

9. The cathode according to claim 4, comprising a conductive agent selected from the group consisting of: fibrous carbon, spherical carbon and carbon black.

10. The nonaqueous electrolyte secondary battery according to claim 8, wherein the conductive agent is fibrous carbon.

11. The cathode according to claim 9, wherein the conductive agent is fibrous carbon.

12. The nonaqueous electrolyte secondary battery according to claim 1, wherein the lithium phosphate compound is a compound represented by $LiFe_{1-y}M_yPO_4$, wherein M is at least one selected from the group consisting of cobalt, manganese, nickel, magnesium, aluminum, boron, titanium, vanadium, niobium, copper, zinc, molybdenum, calcium, strontium, tungsten, and zirconium, and $0<y<1.0$.

13. The cathode active material according to claim 3, wherein the lithium phosphate compound is a compound represented by $LiFe_{1-y}M_yPO_4$, wherein M is at least one selected from the group consisting of cobalt, manganese, nickel, magnesium, aluminum, boron, titanium, vanadium, niobium, copper, zinc, molybdenum, calcium, strontium, tungsten, and zirconium, and $0<y<1.0$.

14. The cathode according to claim 4, wherein the lithium phosphate compound is a compound represented by $LiFe_{1-y}M_yPO_4$, wherein M is at least one selected from the group consisting of cobalt, manganese, nickel, magnesium, aluminum, boron, titanium, vanadium, niobium, copper, zinc, molybdenum, calcium, strontium, tungsten, and zirconium, and $0<y<1.0$.

15. The nonaqueous electrolyte secondary battery according to claim 1, wherein the lithium phosphate compound has an olivine structure.

* * * * *